(12) United States Patent
Kossett

(10) Patent No.: US 8,875,348 B2
(45) Date of Patent: Nov. 4, 2014

(54) FRICTION HINGE SYSTEM

(71) Applicant: Reell Precision Manufacturing Corporation, St. Paul, MN (US)

(72) Inventor: John A. Kossett, Vadnais Heights, MN (US)

(73) Assignee: Reell Precision Manufacturing Corporation, St. Paul, MN (US)

( * ) Notice: Subject to any disclaimer, the term of this patent is extended or adjusted under 35 U.S.C. 154(b) by 0 days.

(21) Appl. No.: 14/015,333

(22) Filed: Aug. 30, 2013

(65) Prior Publication Data

US 2014/0059805 A1 Mar. 6, 2014

Related U.S. Application Data

(60) Provisional application No. 61/695,794, filed on Aug. 31, 2012.

(51) Int. Cl.
*E05C 17/64* (2006.01)
*E05D 11/08* (2006.01)
*G06F 1/16* (2006.01)

(52) U.S. Cl.
CPC ......... *G06F 1/1681* (2013.01); *E05Y 2900/606* (2013.01); *E05D 11/082* (2013.01)
USPC .......................................................... 16/342

(58) Field of Classification Search
USPC ........... 16/337, 342, 340, 338, 387–389, 334, 16/335, 331
See application file for complete search history.

(56) References Cited

U.S. PATENT DOCUMENTS

| | | | | |
|---|---|---|---|---|
| 5,509,176 A | | 4/1996 | Karl | |
| 6,301,748 B1 * | | 10/2001 | Su-Man | 16/342 |
| RE37,712 E * | | 5/2002 | Gannon | 16/342 |
| 6,467,129 B1 * | | 10/2002 | Bae | 16/342 |
| 6,530,123 B1 * | | 3/2003 | Wahlstedt | 16/342 |
| 7,607,202 B1 * | | 10/2009 | Lee | 16/342 |
| 8,245,356 B2 * | | 8/2012 | Chu et al. | 16/342 |
| 2007/0094845 A1 * | | 5/2007 | Chang et al. | 16/342 |
| 2007/0101543 A1 * | | 5/2007 | Lu et al. | 16/342 |
| 2009/0293229 A1 * | | 12/2009 | Chiang | 16/342 |
| 2012/0174339 A1 * | | 7/2012 | Novin | 16/334 |

FOREIGN PATENT DOCUMENTS

| | | |
|---|---|---|
| WO | 9720125 | 6/1997 |
| WO | 02084056 | 10/2002 |

OTHER PUBLICATIONS

The International Search Report and Written Opinion for International Application No. PCT/US2013/057631 mailed Nov. 25, 2013 (10 pgs.).

* cited by examiner

*Primary Examiner* — Chuck Mah
(74) *Attorney, Agent, or Firm* — Dicke, Billig & Czaja, PLLC

(57) ABSTRACT

One aspect is a friction hinge system including a housing having an inner surface, an outer surface and defining a substantially cylindrical opening and a longitudinal slot. A torque element assembly is configured within the housing and configured to extend through the slot thereby securing the torque element assembly relative to the housing.

20 Claims, 7 Drawing Sheets

# FRICTION HINGE SYSTEM

CROSS REFERENCE TO RELATED APPLICATIONS

This Non-Provisional patent application claims the benefit of the filing date of U.S. Provisional Patent Application Ser. No. 61/695,794, filed Aug. 31, 2012, entitled "FRICTION HINGE SYSTEM", which is herein incorporated by reference.

BACKGROUND

Friction hinges are frequently used in commercial products to support objects at specific angular positions relative to a main body. For example, friction hinges are used in notebook computers to support a display at any angular location relative to a base. Such devices often support hinged elements such that a constant resistance, or torque, must be overcome in order to initiate movement of one hinged element relative to another hinged element throughout an entire range of motion.

Functionally, a friction hinge includes components needed to accomplish the hinging and positioning function, and also includes components to afford the ability to mount to the multiple parts of hinged elements. Often the parts needed to effectuate the mounting can complicate the design, add to the expense and require custom parts tailored to each particular application.

For these and other reasons, a need exists for the present invention.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1A:
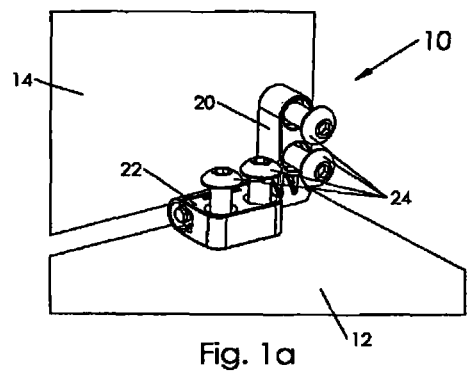
FIGS. 1a and 1b illustrate friction hinge systems from the prior.
Figure 1B:
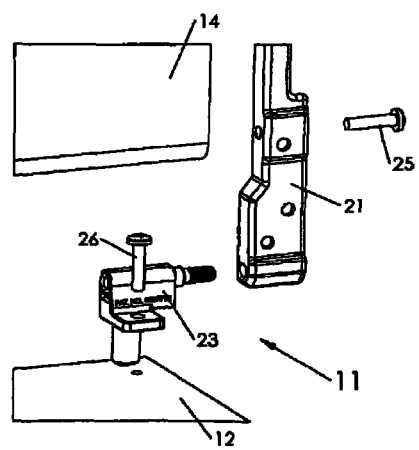

FIGS. 1a and 1b illustrate known friction hinge systems 10 and 11. Friction hinge system 10 includes first hinged part 20 and second hinged part 22, each configured for controlled rotation relative to the other. In operation, friction hinge system 10 is coupled to two hinged elements that are to be controllably mounted relative to each other. For example, a screen 14 of a laptop computer can be hinged relative to a base 12 using friction hinge system 10. First hinged part 20 is coupled to screen 14 and second hinged part 22 is coupled to base 12 using bolts 24 or similar fasteners.

Similarly, friction hinge system 11 includes first hinged part 21 and second hinged part 23, each configured for controlled rotation relative to the other. They too are configured for attachment to hinged elements to be controllable hinged, such as illustrated with first hinged part 21 coupled to screen 14 and second hinged part 23 coupled to base 12, respectively using bolts 25 and 26.

In each case, friction hinge systems 10 and 11 include a system of components that accomplish both 1) a hinging and a positioning function and 2) the ability to mount to the multiple parts of elements that are to be hinged (computer screen 14 and base 12). In many situations, friction hinge systems 10 and 11 represent a saleable component provided by the hinge manufacturer. The customer is able to readily attach the friction hinge system to the hinged elements, such as a laptop computer base and screen.

Figure 2:
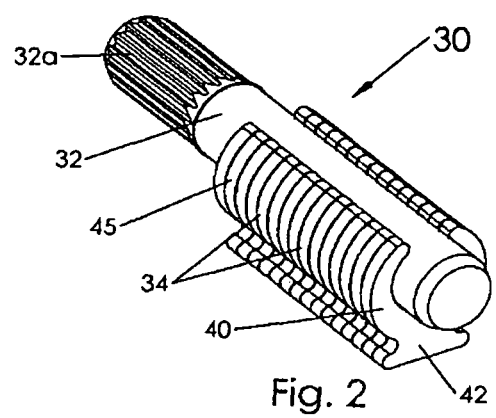
FIG. 2 illustrates a torque element assembly component.

In each case, the hinging and positioning functions of friction hinge systems 10 and 11 are accomplished by a torque element assembly, such as torque element assembly 30 illustrated in FIG. 2. In one case, torque element assembly 30 includes shaft 32 with knurled end 32a and at least one torque element 34. In one case, torque elements 34 include multiple portions including arms 40 and feet 42. Arms 40 collectively form an outer surface 45 defining a partial outer diameter. Arms 40 are radially compressed around shaft 32, which produces rotational friction when shaft 32 is rotated relative to torque elements 34. As such, torque element assembly 30 can provide hinging and positioning for friction hinge systems 10 and 11. Torque element assembly 30 typically consists of one or more torque elements 34 disposed about the shaft 32, with the overall torque of the assembly related to the number of torque elements 34.

As is apparent from FIGS. 1a and 1b, first hinged parts 20 and 21 and second hinged parts 22 and 23 must include mounting features so that friction hinge systems 10 and 11 can be implemented into useful applications. Furthermore, these parts must also accommodate torque element assembly 30. In friction hinge systems 10 and 11, torque element assembly 30 is respectively embedded within second hinged parts 22 and 23. Knurled end 32a then extends out of second hinged parts 22 and 23 so that it is embedded within first hinged parts 20 and 21. Each of the first hinged parts 20 and 21 and second hinged parts 22 and 23 also include features, such as mounting holes, through which bolts 24, 25 and 26, or other screws or fasteners, can be inserted for coupling to the hinged elements.

In some instances, first hinged parts 20 and 21 and second hinged parts 22 and 23 are zinc die cast parts. Zinc is relatively inexpensive relative to other metals, and zinc is also suitable for die casting complex geometries, such as those illustrated in FIGS. 1a and 1b. Torque element assembly 30 can then be pressed into the zinc to provide first hinged parts 20 and 21 and second hinged parts 22 and 23. Features on torque elements 34 are configured to press into complementary features in the zinc.

In other instances, first hinged parts 20 and 21 and second hinged parts 22 and 23 are plastic that is molded over torque element assembly 30 to form friction hinge systems 10 and 11. Here, torque element assembly 30 is placed into a mold. Plastic is then injected into the mold which fills the cavity around torque element assembly 30, filling in against the outside diameter of torque elements 34. The molded plastic forms intermediate structure, such as first hinged parts 20 and 21 and second hinged parts 22 and 23, which may in turn mount to hinged elements.

Plastic overmolding as described also has the ability to eliminate the intermediate mounting part, and attach the torque element assembly directly to the hinged elements. The rest of the cavity can be a wide range of geometries to provide whatever mounting configuration is desired for differing applications. This process eliminates the need for separate assembly processes which, coupled with inexpensive raw materials, make it a desirable solution from a cost perspective.

Less common methods such as cast aluminum, metal injection molding (MIM), and sheet metal can also be used but are less versatile and typically more expensive, so their use is limited.

Although zinc die cast and overmolded plastic and similar materials are widely used, each has inherent design constraints. The housing needs to both hold the torque element assembly and provide suitable mounting geometry at the same time. No matter what the torque element assembly retention method, the final hinge dimensions are substantially larger than the torque element assembly itself This increases the overall size of the final product. Since the mounting geometry of each product is different, final hinge solutions are typically customized for each product which increases development expenses.

There are also concerns with the materials used in these applications. Zinc, for example, is susceptible to creep which can lead to freeplay, or looseness, if designed incorrectly. Over time, the zinc housing may allow some relative movement between it and the torque elements 34. Overmolded plastic solutions are limited by strength and stiffness making plastic hinges larger than metal hinges with equivalent performance characteristics.

While the use of zinc die casting affords great design flexibility, this flexibility is most often achieved at the expense of unique tooling for every application. Designing zinc for a press fit to torque elements 34 requires closely-toleranced parts and minimal draft. The use of zinc may also require the use of additional intermediate structures such as sheet metal to mount to the end use application structure, increasing part count, cost and complexity.

Overmolding torque element assembly 30 often reduces this part count, but may result in a complex part with many dimensional, structural, and functional requirements not shared by torque element assembly 30. Design responsibility of this complex plastic part most often resides with the hinge manufacturer in order to ensure proper torque performance. The need to satisfy these additional requirements and mitigate design risk often increases time-to-market and engineering investment to understand and satisfy these additional requirements.

Figure 3A:
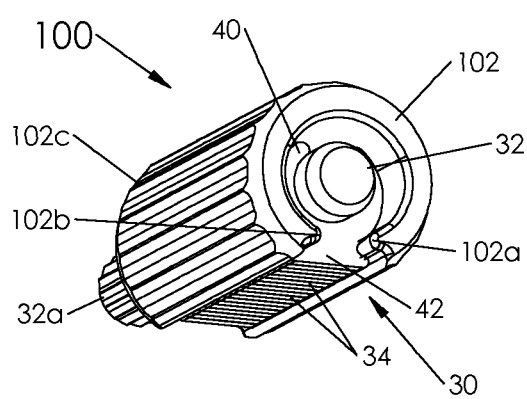
FIGS. 3a and 3b respectively illustrate perspective and end views of a friction hinge system in accordance with one embodiment.
Figure 3B:
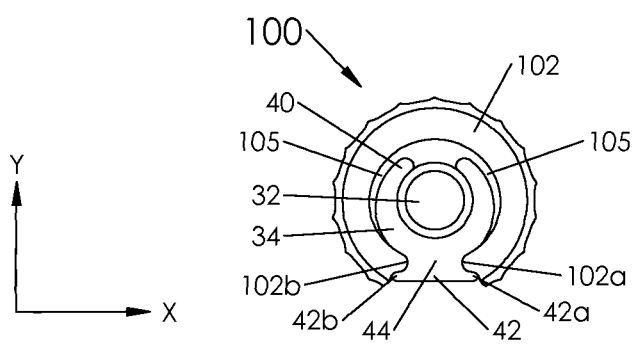

FIGS. 3a and 3b respectively illustrate perspective and end views of a friction hinge system 100 in accordance with one embodiment. Friction hinge system 100 includes direct-mount housing 102 and torque element assembly 30, including shaft 32 and at least one torque element 34. Shaft 32 has and axial length and a knurled portion 32a at one of its ends. In one embodiment, a plurality of torque elements 34 is provided. Each of the plurality of torque elements 34 includes multiple portions, including arms 40 and feet 42 and intermediate portion 44 between the arms 40 and feet 42. In one embodiment, intermediate portion 44 is a thinner neck-like portion, but other configurations are possible, as is discussed below. In one embodiment, feet 42 further include first and second ends 42a and 42b. Each of torque elements 34 is press-fit over shaft 32. Direct-mount housing 102 includes first and second ends 102a and 102b and outer surface 102c.

Friction hinge system 100 is configured to mount directly into hinged elements without the use of bolts, screws, or other fastening means. System 100 avoids the complicated part designs of the prior art, is easily assembled into hinged elements by pressing into a machined or cast round hole, provides a universal hinge design that is minimized for size, contains a minimum number of parts, is compatible with mounting into a wide range of materials such as zinc, aluminum, steel, and plastics, and has low cost.

In operation, friction hinge system 100 is configured to mount and position torque element assembly 30 within a hinged element (such as a laptop computer screen to its base), and specifically, to provide connection between torque elements 34 of torque element assembly 30 and the hinged element. One end of shaft 34 has a knurl portion 32a, which is used as a mounting feature to one part of a hinged element. Direct-mount housing 102 includes outer surface 102c, which is used as a mounting feature to the other hinged part.

Figure 4A:
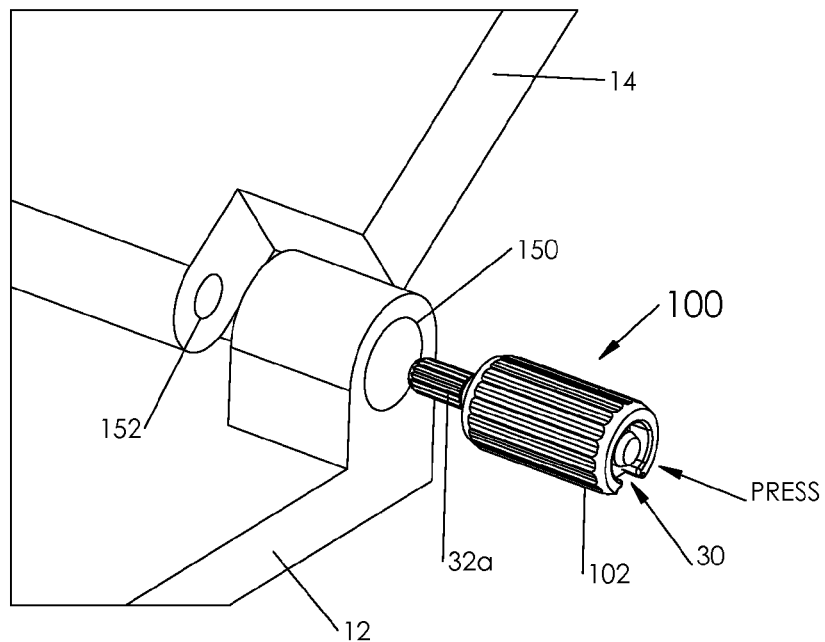
FIGS. 4a and 4b respectively illustrate perspective and end views of an implementation of a friction hinge system in accordance with one embodiment.
Figure 4B:
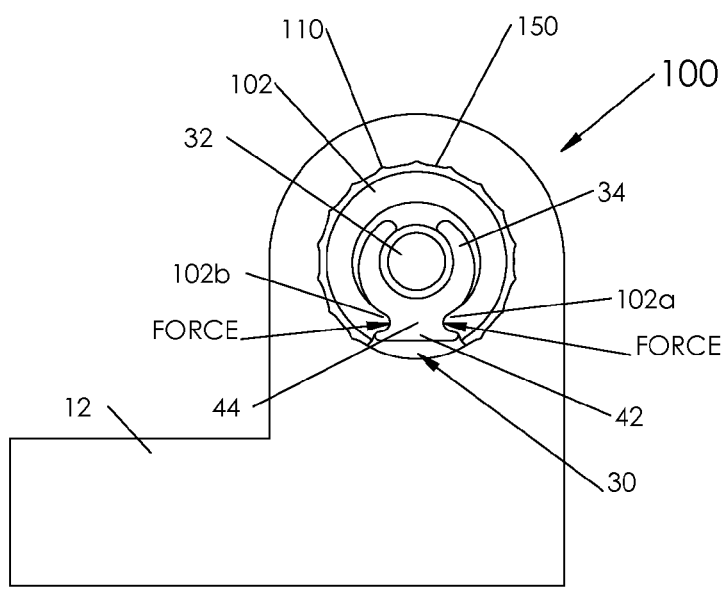

FIGS. 4a and 4b illustrate perspective and end views of friction hinge system 100 being press fit into a hinged element, for example, a laptop computer. In one embodiment, computer base 12 is one hinged element, which is provided with a bore hole 150. In one embodiment, bore hole 150 has an inner diameter that is slightly smaller than the outer diameter of housing 102 defined by its outer surface 102c. As such, direct-mount housing 102 can be pressed into bore hole 150 in the direction of the arrow labeled "press" in FIG. 4a. Similarly, computer screen 14 is the other hinged element, which is provided with a bore hole 152, substantially aligned with bore hole 150. In one embodiment, bore hole 152 has an inner diameter that is slightly smaller than the outer diameter of knurl portion 32a of shaft 32. As such, knurl portion 32a can be pressed into bore hole 152 in the direction of the arrow labeled "press" in FIG. 4a.

As such, since knurl portion 32a of shaft 32 is pressed into bore hole 152, shaft 32 effectively becomes locked to screen 14 and will not rotated relative thereto. Similarly, since direct-mount housing 102 is pressed into bore hole 150, housing 102 effectively becomes locked to base 12 and will not rotated relative thereto. Furthermore, since torque elements 34 cannot rotate relative to direct-mount housing 102 as will be discussed more fully below, they too will not rotated relative base 12. As a result, moving screen 14 relative to base 12 causes shaft 32 to rotate within torque elements 34. Because torque elements 34 are press-fit on shaft 32, the torque produce by their relative rotation provides favorable hinging and positioning of hinged elements base 12 and screen 14.

Accordingly, friction hinge system 100 mounts torque element assembly 30 relative to computer base 12 and computer screen 14 such that they are readily positioned and rotated relative to one another. The mounting is essentially accomplished using the external features of direct-mount housing 102 and knurl portion 32a while eliminating the complicated part designs of the prior art. The computer base 12 and computer screen 14 only need have a machined or cast round hole, and do not require accommodating screws, bolts or other fasteners, minimizing parts and requirements and providing a significant improvement over the prior art.

Figure 5:
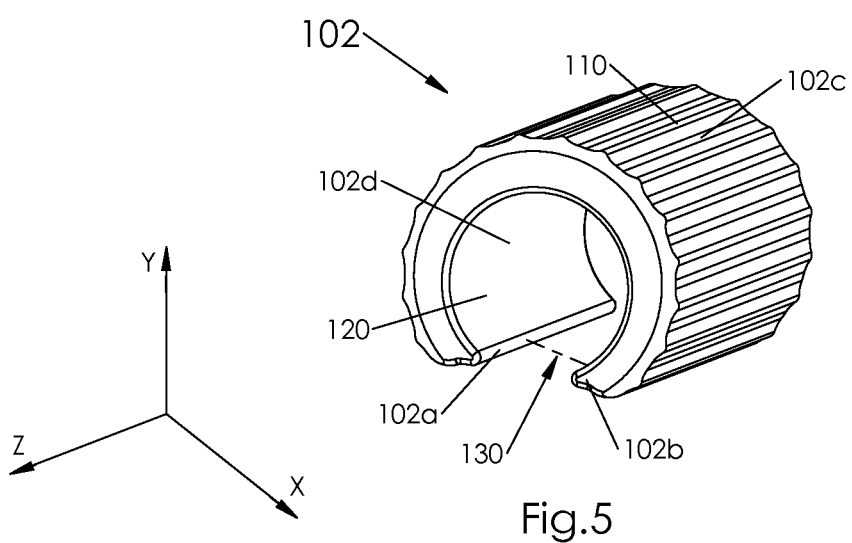
FIG. 5 illustrates a perspective view of a direct-mount housing in accordance with one embodiment.

FIG. 5 illustrates direct-mount housing 102 in accordance with one embodiment. Direct-mount housing 102 includes first and second ends 102a and 102b, outer surface 102c, and inner surface 102d. First and second ends 102a and 102b are spaced apart thereby defining a slot 130 (the width of which is highlighted with a dotted line in FIG. 5) extending in the z-axis direction the entire length of housing 102, as illustrated in FIG. 5. Inner surface 102d of housing 102 is generally cylindrical and generally defines a generally cylindrical opening 120, also extending in the z-axis direction as illustrated in FIG. 5.

With slot 130 running the entire length of direct-mount housing 102 in one embodiment, slot 130 causes the cross-section of housing 102 to be generally "C-shaped" (also seen in FIG. 3b). First and second ends 102a and 102b, one either side of the opening of the "C-shape," provide important securing and alignment functions relative to torque element assembly 30. As illustrated in FIGS. 3a and 3b, in one embodiment first and second ends 102a and 102b are configured to engage a portion of feet 42 and intermediate portion 44 of torque elements 34 adjacent first and second ends 42a and 42b. This engagement between first and second ends 42a and 42b and intermediate portion 44 of feet 42 and first and second ends 102a and 102b of housing 102 not only prevents relative rotation between direct-mount housing 102 and torque elements 34 as shaft 32 is rotated, but also serves to position torque elements 34 in the x and y-axis directions (as illustrated in FIGS. 3b and 5), ensuring proper alignment.

As illustrated in FIG. 5, direct-mount housing 102 includes an interior surface 102d that defines a substantially cylindrical opening 120. The diameter defined by interior surface 102d (as illustrated for example in FIG. 5) is at least slightly larger than the diameter defined by the external surface 45 of torque elements 34 (as illustrated for example in FIG. 2) of friction hinge assembly 30. As such, in one embodiment interior surface 102d of direct-mount housing 102 provides clearance 105 to torque element assembly 30, with the exception of the engagement between feet 42 and intermediate portion 44 and first and second ends 102a and 102b, as illustrated in FIG. 3b. This provided clearance 105 ensures that direct-mount housing 102 will not adversely affect the torque generated in friction hinge assembly 30 by interfering with arms 40 of torque elements 34. Stated another way, in one embodiment the torque generate by the relative rotation of shaft 32 within friction element arms 40 is not interfered with by housing 102 because of clearance 105 provided therebetween.

Unlike prior designs that completely surrounded torque elements 34, direct-mount housing 102 in accordance with one embodiment provides an efficient and low-profile enclosure for friction hinge assembly 30, while at the same time provides a clearance 105 from the arms 40 of torque elements 34 so as to not affect overall torque. Unlike prior designs, tight tolerances and interplay between the outer housing and torque elements 34 is not a factor in direct-mount housing 102, greatly simplifying the design.

In one embodiment, feet 42 within slot 130 of direct-mount housing 102, and specifically their engagement with first and second ends 102a and 102b, provides the only engagement between friction hinge assembly 30 and direct-mount housing 102. In this way, the engagement is limited to the feet 42 of torque elements 34, which will not affect the torque generated in friction hinge assembly 30, because arms 40 remain unengaged. In other embodiments, first and second ends 102a and 102b of housing 102 can be configured to engage various portions of torque elements 34, including all or portions of any of arms 40, feet 42 and/or intermediate portion 44.

In one embodiment, outer surface 102c of direct-mount housing 102 includes features 110. In one embodiment, features 110 are multiple protrusions extending radially outward from outer surface 102c. Features 110 not only position direct-mount housing 102 within a hinged element, such as in bore hole 150 in FIG. 4, but also engage the material into which direct-mount housing 102 is pressed. This material engagement between features 110 and the diameter of bore hole 150 securely holds friction hinge system 100 in place without the use of bolts, screws or other fasteners, greatly simplifying design, reducing parts and cost.

In one exemplary configuration, features 110 on outer surface 102c of housing 102 are protrusions formed on an arc of a circle greater than 180 degrees, but less than 360 degrees. This both accommodates slot 120 and also provides a sufficient amount of features 110 to securely mount within bore hole 150. Also, in one configuration, bore hole 150 is a simple hole in the hinged element, such as in base 12, where the hinged element structure is comprised of a material that is less hard than the material of direct-mount housing 102. For example, where direct-mount housing 102 is sintered powdered metal, then the material around and forming bore hole 150 is less hard than sintered powdered metal.

In one embodiment, the material for direct-mount housing 102 is sintered powdered metal, having the flexibility in geometry, high strength, low cost, and compliance needed to provide mounting of the torque element assembly. However, other materials may be used for direct-mount housing 102, including cast zinc, molded engineered plastics, metal injection molding, and even formed sheet metal to provide some benefit over mounting methods used in prior art.

The combination of features 110 or a harder material pressed into bore hole 150 of softer material allows for features 110 to deform the adjacent material into which they are mounted, allowing for secure retention with simple geometry and relatively open tolerances. The relative hardness of features 110 and material surrounding bore hole 150 can be reversed as well, and other material combinations are also possible, as long as deformation of either the mounting structure or features 110 allow a secure mounting configuration.

Assembly of torque element assembly 30 into direct-mount housing 102 requires only a simple press fit. The amount of press force is governed by the interference between feet 42 and first and second ends 102a and 102b of housing 102. While housing 102 is generally circular in shape in one embodiment, it may be formed with a variable thickness cross-section in order to optimize the press force of torque element assembly 30 into direct-mount housing 102 while requiring normal manufacturing tolerances of parts.

In one embodiment, assembly of friction hinge system 100 into a part of the hinged element requires only a simple mounting hole in the hinged element to receive the housing, such bore hole 150 illustrated in FIGS. 4a and 4b. Tapped screw holes and mounting screws are no longer required. As such, friction hinge system 100 is a saleable item providing great flexibility of use, ease of assembly, and low cost for the end user. In one embodiment, it requires only a round mounting hole in the customer's structure with proper tolerances to achieve the press fit necessary for mounting. This configuration also allows for a wide range of standard product to further lower end use cost.

Furthermore, because direct-mount housing 102 is open along its entire length at slot 120, the differential in diameters between the outer diameter of direct-mount housing 102 and inner diameter of bore hole 150, pressing direct-mount housing 102 into bore hole 150 will cause first and second ends 102a and 102b of housing 102 to further press in on feet 42 and intermediate portion 44. Once forced into bore hole 150, housing 102 is forced to slightly "close" at its slot 120, such that its slot 120 width (illustrated by the dotted line in FIG. 5) is slightly smaller. The direction of this pressing force from housing 102 onto torque element 34 is illustrated with arrows marked "Force" in FIG. 4b. In the illustrated embodiment, this pressing or pinching force is directed at intermediate portion 44, and in other embodiments it can be directed at other portions of torque elements 34. This pressing force will further secure friction hinge assembly 30 relative to housing 102. In one embodiment, this can help eliminate the creep found in prior designs which led to freeplay or looseness between hinged elements. Here, housing 102 holds friction elements 34 firmly, not allowing creep or freeplay therebetween.

In one embodiment, first and second ends 102a and 102b contact torque elements 34 with some amount of force, a first force, before housing 102 is inserted into bore hole 105. This allows the housing 102 and friction torque assembly 30 to be handled without the two parts coming apart. Once friction hinge system 100 is pressed into bore hole 105, the force from the interference of housing 102 and hole 105 is transmitted to the first and second ends 102a and 102b providing an increased force, that is, a second force that is greater than the first force, on torque element 34.

Figure 6A:
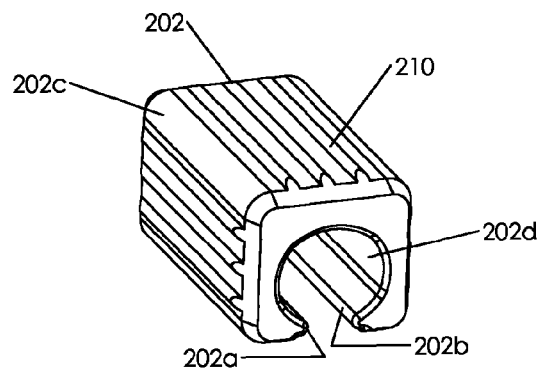
FIGS. 6a-6c illustrate perspective views of direct-mount housings in accordance with alternative embodiments.
Figure 6B:
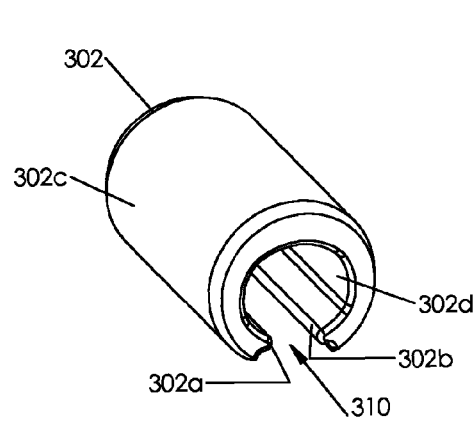
Figure 6C:
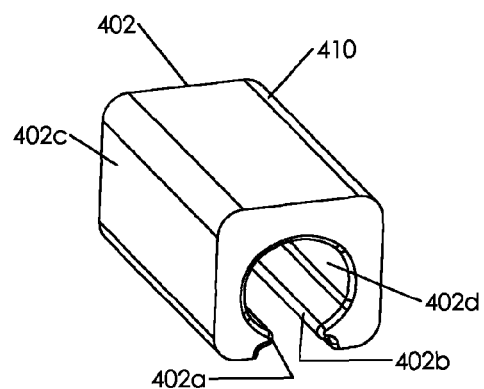
Figure 7A:
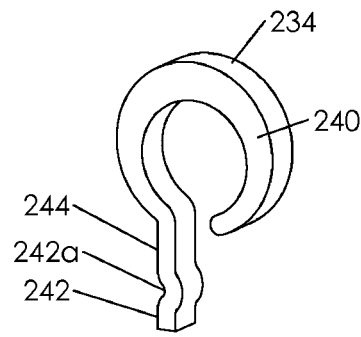
FIGS. 7a-7d illustrate perspective views of torque elements in accordance with alternative embodiments.
Figure 7B:
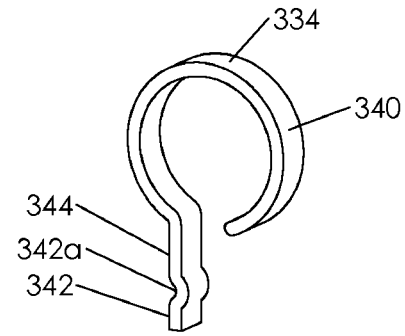
Figure 7C:
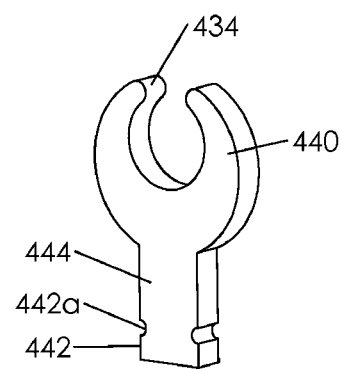
Figure 7D:
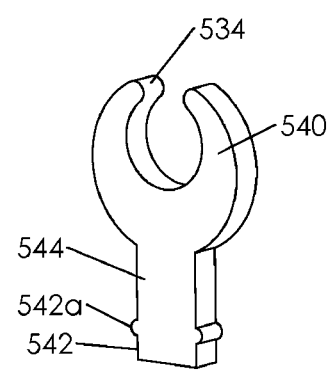

While in one embodiment the mounting structure is a simple round hole, other geometries are possible. FIGS. 6a-6c illustrate alternative direct-mount housings 202, 302, and 402. Each includes first and second ends 202a/302a/402a and 202b/302b/402b and outer and inner surfaces 202c/302c/402c and 202d/302d/402d. While direct-mount housing 302 also requires a mounting structure that is a simple round hole, direct-mount housings 202 and 402 require a substantially square-shaped opening in the mounting structure of the hinged element. Other shapes are possible and only require that the housing protrusion profile follow the mounting hole profile to achieve the necessary press fit.

The embodiment illustrated by direct-mount housing 202 includes features 210, which are raised protrusions on outer surface 202c similar the embodiment 102 of FIG. 5. As in that prior-discuss embodiment, features 210 afford a secure fit when direct-mount housing 202 is pressed in to a mounting hole, such as bore hole 150, when features 210 deform the adjacent material of bore hole 150 or visa versa. The embodiments illustrated by direct-mount housings 302 and 402, however, rely features 310 and 410 to ensure a secure fit.

In the case of direct-mount housing 302, feature 310 is the non-round portion of outer surface 302c, which is caused by the slot between first and second ends 302a and 302b. The non-round feature 310 prevents direct-mount housing 302 from moving within a mounting hole that includes a flat section that is aligned with feature 310. Furthermore, the outer diameter of direct-mount housing 302 that is defined by outer surface 302c is configured to be slightly larger than the inner diameter of a mounting hole, such as bore hole 150. As such, pressing direct-mount housing 302 allows for features 310 to deform the adjacent material into which they are mounted, providing a secure fit. This prevents relative movement between housing 302 and the hinged element into which it is mounted, as well as causing the application of the force (illustrated in FIG. 4b) from housing 302 onto the torque elements 34, further preventing relative movement therebetween.

In the case of direct-mount housing 402, feature 410 is the non-round portion of outer surface 402c, which is caused by both by the slot between first and second ends 402a and 402b and the generally square shape of the housing profile. The non-round feature 410 prevents direct-mount housing 402 from moving within a mounting hole. Furthermore, the outer profile of direct-mount housing 402 that is defined by outer surface 402c is configured to be slightly larger than the inner profile of a mounting hole into which it is pressed. As such, pressing direct-mount housing 402 allows for features 410 to deform the adjacent material into which they are mounted, providing a secure fit. This prevents relative movement between housing 402 and the hinged element into which it is mounted, as well as causing the application of the force (illustrated in FIG. 4b) from housing 402 onto torque elements 34, further preventing relative movement therebetween.

FIGS. 7a-7d illustrate alternative torque elements 234-534 in accordance with alternative embodiments of torque element assemblies. In each case, torque elements 234-534 are configured to be press fit over a shaft, such as torque elements 34 pressed over shaft 32 in FIG. 2, to form a torque element assembly, such as torque element assembly 30. These torque element assemblies can then be integrated into direct-mount housings, such as illustrated and described above. In each case, torque elements 234-534 include arms 240/340/440/540 and feet 242/342/442/542, along with an intermediate portion 244/344/444/544 therebetween. Similar to torque elements 34, torque elements 234-534 are configured to have width, in the direction of shaft 34, that is smaller than a radius formed by arms 240/340/440/540.

In each case, it is the friction fit and relative movement of the shaft 32 and arms 240/340/440/540 that creates the torque in the torque element assembly. It is also noted that arms 440 and 540 have a similar configuration to arm 40 above with a split between two portions of arms 440/540, whereas arms 240 and 340 have a split near intermediate portions 244/344 such that arms 240 and 340 have single connected arms portions rather than split. In either case, it is the friction fit of the arms 240/340/440/540 over shaft 32 that allows creation of torque.

As above, the engagement between the direct-mount housing and the torque element assembly can be provided by the housing engaging one or more of feet 242/342/442/542, intermediate portions 244/344/444/544 or arms 240/340/440/540, or combinations thereof or portions thereof. In some cases, features 242a/342a/424a/524a are added to feet 242/342/442/542 in order to provide further engagement between the direct-mount housing and the torque element assembly.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A friction hinge system comprising:
   a housing having an outer surface and having an inner surface that defines a substantially cylindrical opening and a longitudinal slot along a longitudinal axis defining slot ends; and
   a torque element assembly comprising a shaft and at least one torque element stacked along and frictionally engaged with the shaft and configured substantially within the opening of the housing such that the at least one torque element is substantially contained within the opening;
   the at least one torque element comprising arms and feet and configured such that at least a portion of the feet extend through the slot in the housing so that the housing engages at least some portion of the at least one torque element thereby securing the at least one torque element relative to the housing;
   characterized in that the outer and inner surfaces of the housing are joined at the longitudinal slot ends such that there is no fully closed portion of the housing along the longitudinal axis such that a force applied to the outer surface on the housing toward the at least one torque element applies a pinching force by the slot ends on the at least one torque element.

2. The friction hinge system of claim 1 further configured such that there is clearance between the arms and the housing such that torque generated by relative rotation of the shaft and the at least one torque element is substantially unaffected by the housing.

3. The friction hinge system of claim 1, wherein the housing is configured with a feature on its outer surface for securing the housing to a hinged element and wherein the torque element assembly comprises a plurality of torque elements.

4. The friction hinge system of claim 1, wherein the housing is configured to be press-fitted within an opening in a hinged element and wherein the housing has an outer diameter that is larger than an inner diameter of the opening in a hinged element such that when the housing is secured within the opening in a hinged element the housing applies an increased force on a portion of the torque element that is extending through the slot in the housing.

5. The friction hinge system of claim 1, wherein the outer surface of the housing defines a generally cylindrical shape and the longitudinal slot extends the entire length of the cylindrical shape.

6. The friction hinge system of claim 1, wherein the housing has a thickness comprising the distance radially from the inner to the outer surface, and wherein the thickness is generally less than a housing length along its longitudinal axis.

7. The friction hinge system of claim 1, wherein the longitudinal slot forms a first end and a second end of the housing, the first end and second end configured to hold and position the feet of the torque element thereby holding and positioning the torque element assembly.

8. The friction hinge system of claim 7, wherein the first end and second end of the housing are configured to engage an intermediate portion of the at least one torque element thereby holding and positioning the torque element assembly.

9. The friction hinge system of claim 1, wherein the outer surface comprises at least one protrusion configured to provide interference and compliance with an opening in a structure in which the friction hinge system is mounted and such that material of either the at least one protrusion or adjacent structure is deformed by the interference.

10. The friction hinge system of claim 9, wherein the outer surface comprises a plurality of protrusions configured to provide interference and compliance with an opening in a structure in which the friction hinge system is mounted.

11. The friction hinge system of claim 1, wherein the outer surface of the housing defines a non-round shape.

12. The friction hinge system of claim 11, wherein the outside surface of the housing defines a generally rectangular shape.

13. A friction hinge system comprising:
    a longitudinal housing having a substantially cylindrical opening and a longitudinal slot defining first and second ends; and
    a torque element assembly comprising a shaft and at least one torque element stacked along and frictionally engaged with the shaft and configured substantially within the opening of the housing;
    the at least one torque element comprising first and second portions and configured such that the second portion of the at least one torque element extend through the longitudinal slot;
    wherein the housing is configured to be press-fitted within an opening in a hinged element and wherein the opening of the hinged element is dimensioned to be smaller than an outer dimension of the housing such that the first and second ends of the housing apply an increased force on the second portion of the at least one torque element when the housing is pressed within the opening.

14. The friction hinge system of claim 13, wherein the housing is configured with a feature on an outer surface for securing the housing within the opening of the hinged element and such that material of either the feature or adjacent hinged element is deformed by an interference therebetween.

15. The friction hinge system of claim 13, the torque element assembly comprises a plurality of torque elements.

16. The friction hinge system of claim 13, wherein an outer surface of the housing defines a generally cylindrical shape.

17. The friction hinge system of claim 13, wherein an outer surface of the housing defines a non-round shape.

18. The friction hinge system of claim 13, wherein an outer surface of the housing defines a generally rectangular shape.

19. The friction hinge system of claim 13, configured such that there is clearance between the housing and at least the first portion of the at least one torque element.

20. The friction hinge system of claim 13, wherein the first portion is one of feet of the at least one torque element and an intermediate portion of the at least one torque element.

* * * * *